United States Patent [19]

Kuwana et al.

[11] Patent Number: 4,779,935

[45] Date of Patent: Oct. 25, 1988

[54] ANTI-SKID APPARATUS FOR AN AUTOMOTIVE VEHICLE

[75] Inventors: Kazutaka Kuwana, Toyota; Hiroshi Kuromitsu, Chiryu; Hiroaki Takeuchi, Toyota; Nobuyasu Nakanishi, Toyota; Noboru Noguchi, Toyota, all of Japan

[73] Assignees: Aisin Seiki Kabushiki Kaisha; Toyota Jidosha Kabushiki Kaisha, both of Aichi, Japan

[21] Appl. No.: 134,156

[22] Filed: Dec. 17, 1987

[30] Foreign Application Priority Data

Dec. 19, 1986 [JP] Japan .................. 61-305046

[51] Int. Cl.$^4$ ............................... B60T 8/40
[52] U.S. Cl. ........................ 303/116; 303/11
[58] Field of Search ............ 303/2, 10, 11, 113, 303/116, 117, 119

[56] References Cited

U.S. PATENT DOCUMENTS

| | | | |
|---|---|---|---|
| 4,618,189 | 10/1986 | Nakanishi et al. | 303/116 |
| 4,636,010 | 1/1987 | Adachi et al. | 303/115 |
| 4,655,509 | 4/1987 | Ando et al. | 303/10 |
| 4,660,899 | 4/1987 | Ando et al. | 303/115 |
| 4,708,407 | 11/1987 | Maehara | 303/116 |
| 4,715,666 | 12/1987 | Farr | 303/116 |

FOREIGN PATENT DOCUMENTS 49-28307 7/1974 Japan .
56-142733 11/1981 Japan .
62-191260 8/1987 Japan .
2175362A 3/1986 United Kingdom .

Primary Examiner—Duane A. Reger
Attorney, Agent, or Firm—Burns, Doane Swecker & Mathis

[57] ABSTRACT

An anti-skid apparatus for installation in a vehicle braking system having a master cylinder, a wheel brake cylinder and a primary fluid passage connecting the cylinders includes a changeover valve disposed in the primary passage to selectively communicate the wheel brake cylinder with the master cylinder or with a reservoir, and a fluid pump for pumping a brake fluid from the reservoir and returning it to a point of the primary passage between the master cylinder and the changeover valve, via a check valve. The anti-skid apparatus further includes a cut-off valve disposed in the primary passage between the master cylinder and the point where the pumped fluid is returned, and a regulator valve disposed in a recirculation passage for recirculating the pumped fluid to the reservoir. The cut-off valve normally allows a flow of the fluid and inhibits the flow of the fluid when the hydraulic pressure from the master cylinder exceeds the pressure from the wheel brake cylinder by at least a predetermined value. The regulator regulates the pressure of the pumped fluid at a value higher than the pressure from the wheel brake cylinder by a predetermined value.

7 Claims, 2 Drawing Sheets

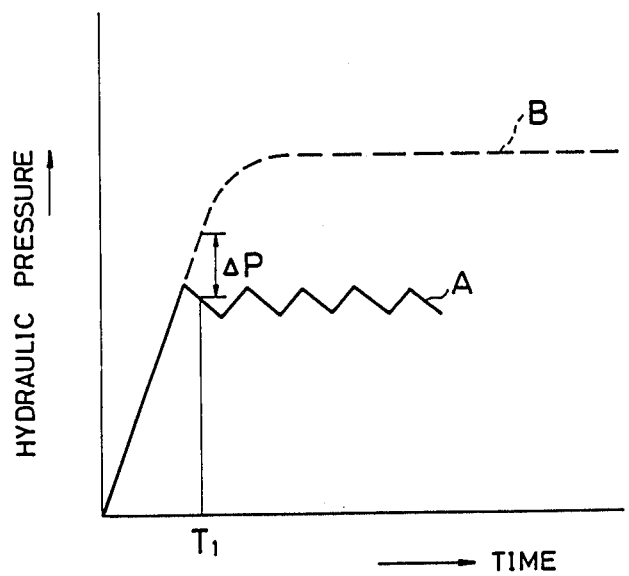

4,779,935

ANTI-SKID APPARATUS FOR AN AUTOMOTIVE VEHICLE

BACKGROUND OF THE INVENTION

1. Field of the Invention

The present invention relates to an anti-skid apparatus for use in an automotive vehicle, and more particularly, to an anto-skid apparatus for installation in a vehicle braking system between a master cylinder and wheel brake cylinders to prevent the vehicle wheels from locking in braking operation.

2. Description of the Prior Art

As one such anti-skid apparatus as described above, Japanese Patent Publication for Opposition in 1984 under Publication No. 49-28307 discloses an anti-skid apparatus wherein an input control valve and an output control valve are disposed in parallel with each other in a primary fluid passage connecting a master cylinder and a wheel brake cylinder, and is disposed a fluid pump for pumping a brake fluid from a reservoir connected to the output control valve and returning the pumped brake fluid via a pump passage to the primary fluid passage at a point thereof between the master cylinder and the input control valve. Further, Japanese Patent Application laid open in 1981 under Publication No. 56-142733 discloses and anti-skid apparatus wherein a solenoid valve selectively placed in one of a forst operating position for communication of the wheel brake cylinder with the master cylinder, and a operating position for communication of the wheel brake cylinder with the reservoir is disposed in the primary fluid passage, in lieu of the input and output control valves, and wherein a check valve is also disposed in a portion of the primary fluid passage between the master cylinder and the point to which the fluid pump is connected through the pump passage. This check valve is provided to prevent a so-called "kick-back" phenomenon of a brake pedal which causes unpleasant shocks on the brake pedal. The "kick-back" phenomenon is conventionally encountered due to a return flow of the brake fluid from the fluid pump to the primary fluid passage, and to the master cylinder.

In the anti-skid apparatus disclosed in the Publication No. 56-142733, the check valve is opened if the pressure on the side of the fluid pump becomes lower than the pressure on the side of the master cylinder, while the check valve is in its closed position to block a flow of the brake fluid from the fluid pump toward the master cylinder. To prevent this phenomenon, in U.S. Pat. No. 4,618,189, it has been proposed to provide an anti-skid pressure control means further comprising a check valve disposed in a portion of the primary fluid passage between the master cylinder and the shut-off valve (i.e.,the aforementioned check valve) and adjacent to an accumulator, and a valve-control mechanism disposed between the check valve newly provided and the accumulator for controlling this newly provided check valve. This newly provided check valve, which is normally held in its open position, is provided to block a flow of the brake fluid from the master cylinder toward the shut-off valve. Accordingly, the shut-off valve will not be opened even if the hydraulic pressure in the master cylinder becomes higher than that in the pump passage. In the above-described anti-skid pressure control means, however, the valve-control mechanism and the shut-off valve are quite complicated because they are arranged to be operated in response to the hydraulic pressure of the pumped brake fluid. In addition, although the pressurized brake fluid from the fluid pump is stored in the accumulator if the hydraulic pressure in the master cylinder is higher than that in the pump passage, the brake fluid is pressurized by the fluid pump irrespective of a variation of the hydraulic pressure in the wheel brake cylinder to which the pressurized brake fluid is applied. Thus, the fluid pump is often activated to pressurize the brake fluid at a higher level than a necessary level, which results in not only a loss of energy but also a need for large capacity of the fluid pump. Accordingly, the anti-skid pressure control means is still expensive.

SUMMARY OF THE INVENTION

Accordingly, it is an object of the present invention to provide an anti-skid apparatus for an automotive vehicle wherein a simple construction can be adapted to prevent the "kick-back" phenomenon, and wherein the anti-skid apparatus is economical to manufacture.

It is another object of the present invention to provide an anti-skid apparatus for an automotive vehicle, having a cut-off valve for preventing the "kick-back" phenomenon which will not be opened even if the hydraulic pressure in the master cylinder becomes higher than that in the wheel brake cylinder, and a regulator valve for regulating the hydraulic pressure of the pumped brake fluid from the fluid pump based upon the hydraulic pressure of the brake fluid of the wheel brake cylinder thereby to eliminate unnecessary rise of the hydraulic pressure in the fluid pump.

In accomplishing these and other objects, an anti-skid apparatus for an automotive vehicle according to the present invention is installed in a vehicle braking system having a master cylinder and a wheel brake cylinder connected therebetween through a primary fluid passage. The anti-skid apparatus according to the present invention comprises a changeover valve disposed in the primary fluid passage and selectively placed in one of a first operating position for communication of the wheel brake cylinder with the master cylinder, and a second operating position for communication of the wheel brake cylinder with a reservoir through a reservoir passage, the changeover valve being switched between the first and second operating positions under the control of a controller when a vehicle wheel tends to be locked in braking operation, a fluid pump for pumping a brake fluid from the reservoir and returning the pumped brake fluid to the primary fluid passage at a point thereof between the master cylinder and the changeover valve through a check valve disposed in a pump passage connected between the fluid pump and the primary fluid passage, a check valve disposed in the pump passage, the check valve inhibiting a flow of the brake fluid therethrough in a direction from the above-mentioned point toward the fluid pump. In the above arrangement, the anti-skid apparatus according to the present invention further comprises a cut-off valve disposed in a portion of the primary fluid passage between the master cylinder and the above-mentioned point, the cut-off valve normally allowing a flow of the brake fluid through the portion, and the cut-off valve inhibiting the flow of the brake fluid through the portion when the hydraulic pressure from the master cylinder exceeds the hydraulic pressure from the wheel brake cylinder by at least a predetermined value, a recirculation passage for recirculating the pumped brake fluid to the reservoir, and a regulator valve disposed in the recirculation passage, the regulator valve regulating a hydraulic pressure of the pumped brake fluid returned to the primary fluid passage at a value higher than the hydraulic pressure of the fluid of the wheel brake cylinder by a predetermined value.

BRIEF DESCRIPTION OF THE DRAWINGS

The above stated objects and following description will become readily apparent with reference to the accompanying drawings, in which:

FIG. 2 is a diagram showing a variation of a hydraulic pressure of a master cylinder and that of a wheel brake cylinder in the embodiment of FIG. 1.

DESCRIPTION OF THE PREFERRED EMBODIMENT

Figure 1:
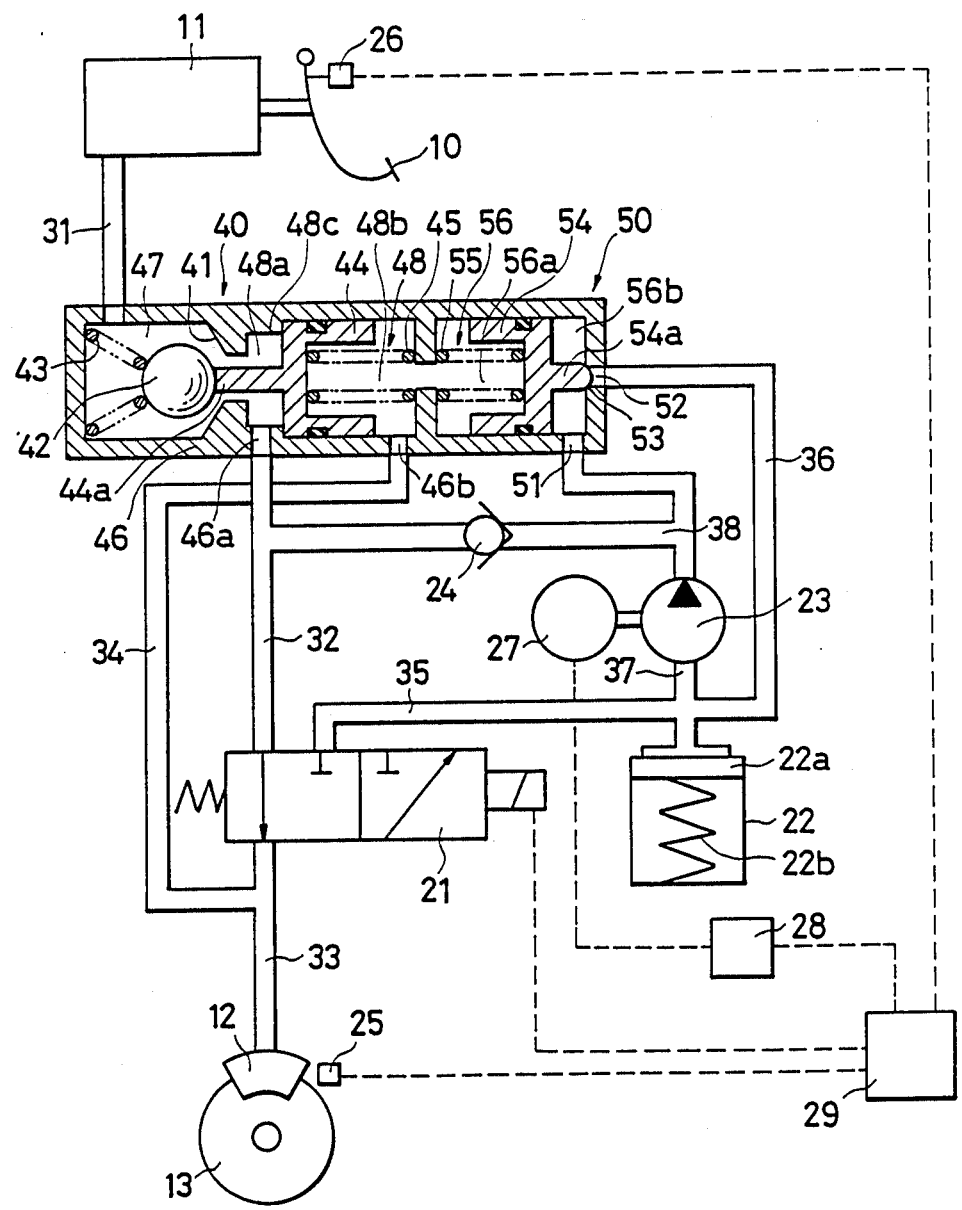
FIG. 1 is a schematic illustration of an anti-skid apparatus installed in a vehicle braking system according to a preferred embodiment of the present invention.

Referring to FIG.1, there is schematically illustrated a braking system for an automotive vehicle which includes a master cylinder 11 to be activated by depression of a brake pedal 10. A hydraulic pressure developed in the master cylinder 11 is applied to a wheel brake cylinder 12 provided for a vehicle wheel 13, which is one of four wheels of the vehicle. Only the vehicle wheel 13 is illustrated in FIG. 1 in the interest of simplification, since the construction and function of other vehicle wheels are the same as those of the vehicle wheel 13.

The braking system includes an anti-skid apparatus which comprises a speed sensor 25 for detecting the rotational speed of the vehicle wheel 13 and a controller 29 for producing an electric control signal depending upon the output of the speed sensor 25. The anti-skid apparatus further comprises a cut-off valve 40 and a regulator valve 50 which are assembled within a common housing, a changeover valve 21, a reservoir 22, a fluid pump 23, a pump motor 27, a driving circuit 28 and a check valve 24. The master cylinder 11 is communicated with the wheel brake cylinder 12 through a primary fluid passage comprising a first passage 31, a second passage 32 and a third passage 33. The master cylinder 11 is connected to the cut-off valve 40 through the first passage 31, and the cut-off valve 40 is connected to the changeover valve 21 through the second passage 32.

The changeover valve 21 is a solenoid-operated directional control valve having three ports and taking two positions, which is arranged to be energized in response to the electric control signal from the controller 29 to control the hydraulic pressure applied to the wheel brake cylinder 12. The changeover valve 21 is connected through a reservoir passage 35 to the reservoir 22, which is also connected to the fluid pump 23 through an inlet passage 37. The reservoir 22 has a piston 22a received in a housing communicated with the reservoir passage 35, the inlet passage 37 and a recirculation passage 36 through a port. The piston 22a is biased by a spring 22b toward the port, and movable against biasing force of the spring 22b to define a chamber whose volume is variable. The fluid pump 23 is operated by the pump motor 27 which is actuated by the driving circuit 28 in response to the electric control signal from the controller 29. The fluid pump 23 is connected to the second passage 32 of the primary fluid passage via the check valve 24 which is disposed in a pump passage 38 and allows a fluid flow only in one direction from the fluid pump 23 toward the second passage 32. Accordingly, the brake fluid reserved in the reservoir 22 is pumped out by the fluid pump 23, and returned to the second passage 32.

The changeover valve 21 is selectively placed in one of a first operating position and a second operating position. In the first operating position, the third passage 33 is held in communication with the second passage 32, so that the wheel brake cylinder 12 is communicated with the master cylinder 11 via the cut-off valve 40, as long as the cut-off valve 40 allows the flow of the brake fluid therethrough. In this position, therefore, the hydraulic pressure in the wheel brake cylinder 12 rises with the brake fluid delivered to the second passage 32 from the master cylinder 11 via the cut-off valve 40 or from the fluid pump 23. In the second position, the third passage 33 is held in communication with the reservoir passage 35, so that the wheel brake cylinder 12 is communicated with the reservoir 22. In this position, the hydraulic pressure in the wheel brake cylinder 12 drops with the brake fluid discharged from the wheel brake cylinder 12 to the reservoir 22. The changeover valve 21 is operated under the control of the controller 29 which comprises a microcomputer. The solenoid of the changeover valve 21 is energized in response to the electric control signal from the controller 29. The controller 29 receives a braking signal transmitted by a detector switch 26 which detects a position of the brake pedal 10, and a speed signal transmitted by the speed sensor 25 . Depending upon the speed signal the controller 29 determines a degree of slip of the vehicle wheel 13 on the road surface and generates the electric control signal in the manner known in the art. The pump motor 27 is also controlled by the controller 29 through the driving circuit 28 which is actuated when an anti-skid control of the hydraulic pressure in the wheel brake cylinder 12 is started. The fluid pump 23 is held operated by the pump motor 27 as long as the anti-skid control of the hydraulic pressure continues.

The cut-off valve 40 is disposed between the first passage 31 and the second passage 32, more specifically in a portion of the primary fluid passage between the master cylinder 11 and a point of the second passage 32 where the pump passage 38 is connected. A housing 46 of the cut-off valve 40 is formed with a valve chamber 47 and a piston chamber 48 which is communicated with the valve chamber 47 through a hole which is provided in a partition wall of the housing 46 between the valve chamber 47 and the piston chamber 48. The valve chamber 47 is formed with a valve seat 41 around that hole. A spherical valve member 42 is accommodated in the valve chamber 47, and biased by a spring 43 toward the valve seat 41. In concentric relation with the valve chamber 47, is formed the piston chamber 48 within which a piston 44 is slidably received in a substantially fluid-tight condition with respect to the inner surface of the piston chamber 48. The piston 44 is biased by a spring 45, whose biasing force is larger than that of the spring 43, toward a shoulder portion 48c formed in the inner surface of the piston chamber 48. The piston 44 has a protrusion 44a formed at its one end facing with the valve chamber 47. The protrusion 44a extends through the hole between the valve chamber 47 and the piston chamber 48 for abutting contact with the spherical valve member 42. The length of the protrusion 44a is determined so that the protrusion 44a keeps the spherical valve member 42 away from the valve seat 41 by a slight distance when the piston 44 is located at its fully advanced position at which the protrusion 44a abuts on the spherical valve member 42. The valve chamber 47 is communicated with the master cylinder 11 through the first passage 31. The piston chamber 48 is divided by the piston 44 into two chambers, a first piston chamber 48a and a second piston chamber 48b. The first piston chamber 48a is communicated with the second passage 32 through a port 46a. The second piston chamber 48b is communicated via a port 46b with a fourth passage 34 which is connected to the wheel brake cylinder 12. Accordingly, the cut-off valve 40 is so arranged that the cut-off valve 40 is closed when the hydraulic pressure (B) in the master cylinder 11 exceeds the hydraulic pressure (A) in the wheel brake cylinder 12 by at least a predetermined value ($\Delta P$), as shown in FIG. 2.

As shown in FIG. 1, the cut-off valve 40 is associated with the regulator valve 50 coaxially within a common housing 46. A piston 54 is slidably and fluid tightly received in a regulator chamber 56 defined in the housing 46, and is biased by a spring 55 toward a valve seat 53 which is formed at the opposite side of the cut-off valve 40. The regulator chamber 56 is divided into two chambers a first regulator chamber 56a and a second regulator chamber 56b by the piston 54. The first regulator chamber 56a is communicated with the second piston chamber 48b of the cut-off valve 40, so that the first regulator chamber 56a is applied with the hydraulic pressure of the wheel brake cylinder 12. On an open end of a port 52, there is formed the valve seat 53, through which the second regulator chamber 56b is communicated with the recirculation passage 36. This recirculation passage 36 is communicated with the reservoir 22. The second regulator chamber 56b is also communicated with the pump passage 38 through a port 51. The piston 54 is formed, at its one end, with a valve member 54a which is biased by the spring 55 toward the valve seat 53, thereby normally seated on the valve seat 53. Accordingly, the second regulator chamber 56b is applied with the hydraulic pressure of the pumped brake fluid from the fluid pump 23 through the pump passage 38.

In the normal condition of the braking system described above, the cut-off valve 40 is normally open, so that the first passage 31 is communicated with the second passage 32, and further with the third passage 33 while the changeover valve 21 maintains its first operating position as shown in FIG. 1. Upon depression of the brake pedal 10 in this condition, the pressurized brake fluid is delivered from the master cylinder 11 to the wheel brake cylinder 12 through the first passage 31, the valve chamber 47 and the first piston chamber 48a of the cut-off valve 40, the second passage 32, the changeover valve 21 and the third passage 33. Since the fluid pump 23 is held off in this condition, the hydraulic pressure of the brake fluid in the first piston chamber 48a is substantially the same as that in the second piston chamber 48b of the cut-off valve 40. That is, the piston 44 holds its position as shown in FIG. 1, so that the cut-off valve 40 holds the first passage 31 and the second passage 32 in fluid communication. Accordingly, a brake force is applied to the vehicle wheel 13, whereby the vehicle speed is reduced.

When an excessive amount of slip of the vehicle wheel 13 is detected by the controller 29 based upon the speed signal from the speed sensor 25, the changeover valve 21 is switched from its first operating position to its second operating position, whereby the third passage 33 is communicated with the reservoir passage 35, and its fluid communication with the second passage 32 is blocked while its fluid communication with the fourth passage 34 is maintained. With the changeover valve 21 switched into its second operating position, the brake fluid is discharged from the wheel brake cylinder 12 to the reservoir 22, and thus the hydraulic pressure in the wheel brake cylinder 12 is reduced. The pump motor 27 is also actuated by the driving circuit 28 in response to the control signal from the controller 29, so that the fluid pump 23 starts to feed the brake fluid to the second passage 32 via the check valve 24. In this initial stage in which the changeover valve 21 is switched into its second operating position and the fluid pump 23 is activated, therefore, the hydraulic pressure in the first piston chamber 48a of the cut-off valve 40, i.e., the hydraulic pressure (B) in the master cylinder 11, becomes higher than such a hydraulic pressure that is higher than the hydraulic pressure (A) in the wheel brake cylinder 12 by a predetermined value ($\Delta P$) at the time (T1), as shown in FIG. 2. Consequently, the piston 44 of the cut-off valve 40 is moved toward the regulator valve 50, whereby the spherical valve member 42 is seated on the valve seat 41 by the spring 43. Thus, the cut-off valve 40 inhibits the flow of the brake fluid therethrough. Since the second passage 32 is blocked by the changeover valve 21 in its second operating position, the pressurized brake fluid is applied in the first piston chamber 48a of the cut-off valve 40 whereby the piston 44 maintains its position.

When the fluid pump 23 is activated during depression of the brake pedal 10, the piston 54 of the regulator valve 50 is moved in accordance with the difference in pressure between the first regulator chamber 56a and the second regulator chamber 56b. When the hydraulic pressure in the second regulator chamber 56b is increased to a value which is higher, by a predetermined value, than the hydraulic pressure in the first regulator chamber 56a, i.e., that in the wheel brake cylinder 12, the piston 54 is moved away from the valve seat 53 and permits the flow of the brake fluid from the fluid pump 23 to the reservoir 22 through the recirculation passage 36. The excessive pressurized brake fluid from the fluid pump 23 is forced into the reservoir 22 and stored therein. On the other hand, when the hydraulic pressure in the first regulator chamber 56a is higher than that in the second regulator chamber 56b, the valve member 54a is seated on the valve seat 53. Accordingly, the hydraulic pressure of the pumped brake fluid from the fluid pump 23 is controlled at the value which is higher than the hydraulic pressure in the wheel brake cylinder 12 by a predetermined value, but lower than the hydraulic pressure in the master cylinder 11. Thus, the hydraulic pressure in the master cylinder 11 will not be applied to the wheel brake cylinder 12. In this condition, the changeover valve 21 is switched to its first operating position in response to the control signal from the controller 29, and the pumped brake fluid from the fluid pump 23, whose hydraulic pressure is slightly higher than that in the wheel brake cylinder 12, is fed into the wheel brake cylinder 12 through the pump passage 38, the check valve 24, the second passage 32, the changeover valve 21 and the third passage 33. Thus, the flow of the brake fluid from the fluid pump 23 toward the master cylinder 11 is prevented by the cut-off valve 40 in which the spherical valve member 42 is held seated on the valve seat 41 during the anti-skid control. The changeover valve 21 is controlled by the controller 29 so as to keep the hydraulic pressure in the wheel brake cylinder 12 within a suitable range in which the slip of the vehicle wheel 13 is held below a permissible limit.

When the anti-skid control is terminated and the brake pedal 10 is returned to its original position, the changeover valve 21 is returned to its normal first operating position and the fluid pump 23 is turned off by the controller 29 in response to the signal generated from the detector switch 26. Consequently, the difference in the hydraulic pressure between the first piston chamber 48a and the second piston chamber 48b disappears, and the spherical valve member 42 and the piston 44 are returned to their normal positions, as shown in FIG. 1. Then, the brake fluid in the reservoir 22 is pumped by the fluid pump 23 and returned to the master cylinder 11 via the check valve 24 and the cut-off valve 40.

It should be apparent to one skilled in the art that the above-described embodiment is merely illustrative of but a few of the many possible specific embodiments of the present invention. For example, the changeover valve 21 of three ports-two positions solenoid-operated directional control valve can be substituted by a combination of an input control valve of two ports-two positions solenoid-operated directional control valve disposed between the second passage 32 and the third passage 33, and an output control valve of two ports-two positions solenoid-operated directional control valve disposed between the third passage 33 and the reservoir passage 35. Numerous and various other arrangements can be readily devised by those skilled in the art without departing from the spirit and scope of the invention as defined in the following claims.

What is claimed is:

1. An anti-skid apparatus for an automotive vehicle for installation in a vehicle braking system having a master cylinder and a wheel brake cylinder connected therebetween through a primary fluid passage, comprising:
    a changeover valve disposed in said primary fluid passage and selectively placed in one of a first operating position for communication of said wheel brake cylinder with said master cylinder, and a second operating position for communication of said wheel brake cylinder with a reservoir through a reservoir passage, said changeover valve being switched between said first and second operating positions under the control of a controller when a vehicle wheel tends to be locked in braking operation;
    a fluid pump for pumping a brake fluid from said reservoir and returning the pumped brake fluid to said primary fluid passage at a point thereof between said master cylinder and said changeover valve through a pump passage connected between said fluid pump and said point; and
    a check valve disposed in said pump passage, said check valve inhibiting a flow of said brake fluid therethrough in a direction from said point toward said fluid pump, wherein the improvement comprises:
    a cut-off valve disposed in a portion of said primary fluid passage between said master cylinder and said point, said cut-off valve normally allowing a flow of said brake fluid through said portion, and said cut-off valve inhibiting the flow of said brake fluid through said portion when the hydraulic pressure from said master cylinder exceeds the hydraulic pressure from said wheel brake cylinder by at least a predetermined value;
    a recirculation passage for recirculating said pumped brake fluid to said reservoir; and
    a regulator valve disposed in said recirculation passage, said regulator valve regulating a hydraulic pressure of said pumped brake fluid returned to said primary fluid passage at a value higher than the hydraulic pressure of said brake fluid of said wheel brake cylinder by a predetermined value.

2. An anti-skid apparatus for an automotive vehicle of claim 1, wherein said cut-off valve comprises;
    a valve member seatable on a valve seat disposed within said primary fluid passage, said valve member being normally placed away from said valve seat; and
    a piston applied at one end thereof with a hydraulic pressure from said master cylinder and at the other end thereof with a hydraulic pressure from said wheel brake cylinder, said piston permitting said valve member to be seated on said valve seat when the hydraulic pressure from said master cylinder exceeds the hydraulic pressure from said wheel brake cylinder by at least a predetermined value.

3. An anti-skid apparatus for an automotive vehicle of claim 1, wherein said regulator valve is normally closed to prevent a flow of said pumped brake fluid therethrough from said fluid pump to said reservoir, and said regulator valve allows the flow of said pumped brake fluid therethrough when the hydraulic pressure from said fluid pump becomes higher than the hydraulic pressure of said wheel brake cylinder by a predetermined value.

4. An anti-skid apparatus for an automotive vehicle of claim 3, wherein said regulator valve comprises :
    a housing having at an end portion thereof a port communicated with said recirculation passage;
    a piston slidably received in said housing for dividing said housing into a first regulator chamber communicated with said wheel brake cylinder and a second regulator chamber communicated with said pump passage and said recirculation passage through said port, said piston being formed, at one end portion thereof facing with said second regulator chamber, with a valve member seated on said port thereby to close said port; and
    biasing means accommodated in said first regulator chamber for biasing said piston toward said port.

5. An anti-skid apparatus for an automotive vehicle of claim 1, wherein said cut-off valve comprises:
    a housing having a partition wall provided with a hole and formed with said valve seat therearound, said housing being divided by said partition wall into a valve chamber communicated with said master cylinder and a piston chamber communicated with said changeover valve and said wheel brake cylinder;
    a spherical valve member accommodated in said valve chamber and seated on said valve seat;
    biasing means accommodated in said valve chamber for biasing said spherical valve member toward said valve seat;
    a piston slidably received in said piston chamber for dividing said piston chamber into two chambers one of which is a first piston chamber communicated with said valve chamber through said hole and also communicated with said changeover valve, and the other of which is a second piston chamber communicated with said wheel brake cylinder, said piston being formed with a protrusion at one end thereof facing with said valve chamber and extending through said hole for abutting contact with said spherical valve member; and biasing means accommodated in said second piston chamber for biasing said piston toward said valve chamber.

6. An anti-skid apparatus for an automotive vehicle of claim 5, wherein said piston chamber is formed, around the inner surface thereof, with a shoulder portion which is smaller in inner diameter than said second piston chamber and which abuts on said piston accommodated in said second piston chamber.

7. An anti-skid apparatus for an automotive vehicle of claim 5, wherein said regulator valve comprises:

a housing having at an end portion thereof a port communicated with said recirculation passage;

a piston slidably received in said housing for dividing said housing into a first regulator chamber communicated with said wheel brake cylinder and a second regulator chamber communicated with said pump passage and said recirculation passage through said port, said piston being formed, at one end portion thereof facing with said second regulator chamber, with a valve member seated on said port thereby to close said port; and biasing means accommodated in said first regulator chamber for biasing said piston toward said port, and wherein said housing of said cut-off valve and said housing of said regulator valve are formed as a single common housing, said second piston chamber of said cut-off valve being communicated with said first regulator chamber of said regulator valve.

* * * * *